(12) United States Patent
Hester (10) Patent No.: US 9,106,631 B2
(45) Date of Patent: Aug. 11, 2015

(54) SMART METER TRUST CENTER SWITCH (75) Inventor: Lance Hester, St. Louis Park, MN (US)

(73) Assignee: Honeywell International Inc., Morristown, NJ (US)

( * ) Notice: Subject to any disclaimer, the term of this patent is extended or adjusted under 35 U.S.C. 154(b) by 674 days.

(21) Appl. No.: 13/432,937

(22) Filed: Mar. 28, 2012

(65) Prior Publication Data
US 2013/0262844 A1 Oct. 3, 2013

(51) Int. Cl.
  G06F 15/16 (2006.01)
  H04L 29/06 (2006.01)
  H04L 12/28 (2006.01)
  H04L 29/08 (2006.01)

(52) U.S. Cl.
  CPC ............ *H04L 63/08* (2013.01); *H04L 12/2818* (2013.01); *H04L 12/2834* (2013.01); *H04L 67/12* (2013.01); *Y02B 70/325* (2013.01); *Y04S 20/228* (2013.01); *Y04S 40/24* (2013.01)

(58) Field of Classification Search
  USPC ................... 709/224, 223–24; 700/291, 295; 340/870.02, 870.12, 12.28; 705/400, 705/412; 713/1
  See application file for complete search history.

(56) References Cited

U.S. PATENT DOCUMENTS

| | | | | |
|---|---|---|---|---|
| 6,980,973 | B1 * | 12/2005 | Karpenko | 705/412 |
| 8,019,697 | B2 * | 9/2011 | Ozog | 705/412 |
| 8,289,182 | B2 * | 10/2012 | Vogel et al. | 340/870.02 |
| 8,364,609 | B2 * | 1/2013 | Ozog | 705/412 |
| 8,570,999 | B1 * | 10/2013 | Nguyen et al. | 370/343 |
| 8,706,650 | B2 * | 4/2014 | Ozog | 705/412 |
| 8,798,834 | B2 * | 8/2014 | Jeong et al. | 701/22 |
| 2010/0027516 | A1 | 2/2010 | Nagarajan | |
| 2010/0127889 | A1 * | 5/2010 | Vogel et al. | 340/870.02 |
| 2010/0179704 | A1 * | 7/2010 | Ozog | 700/291 |
| 2010/0217452 | A1 * | 8/2010 | McCord et al. | 700/295 |
| 2010/0217550 | A1 * | 8/2010 | Crabtree et al. | 702/62 |
| 2010/0217651 | A1 * | 8/2010 | Crabtree et al. | 705/10 |
| 2010/0332373 | A1 * | 12/2010 | Crabtree et al. | 705/37 |
| 2011/0035073 | A1 * | 2/2011 | Ozog | 700/291 |
| 2011/0137826 | A1 * | 6/2011 | West et al. | 705/412 |
| 2011/0202196 | A1 * | 8/2011 | Venkatakrishnan et al. | 700/295 |
| 2011/0216692 | A1 | 9/2011 | Lundsgaard et al. | |
| 2011/0231028 | A1 * | 9/2011 | Ozog | 700/291 |
| 2011/0270453 | A1 * | 11/2011 | Kalogridis et al. | 700/291 |
| 2012/0232915 | A1 * | 9/2012 | Bromberger | 705/1.1 |
| 2013/0110621 | A1 * | 5/2013 | Gupta et al. | 705/14.52 |

OTHER PUBLICATIONS

"What is a Wireless Switch and the Value of the Overlay Architecture?", Technical White Paper © Copyright 2005 Symbol Technologies, Inc., (Jan. 2005), 6 pgs.

* cited by examiner

*Primary Examiner* — Saket K Daftuar
(74) *Attorney, Agent, or Firm* — Schwegman Lundberg & Woessner, P.A.

(57) ABSTRACT

An apparatus includes a smart meter trust center switch. The switch includes a computer processor that is configured to execute a subset of functions of a smart meter in a home area network (HAN). The computer processor is also configured to be coupled to and communicate with the smart meter and an advanced metering infrastructure (AMI) and advanced meter reading (AMR) network.

17 Claims, 7 Drawing Sheets

SMART METER TRUST CENTER SWITCH

TECHNICAL FIELD

The present disclosure relates to neighborhood area networks (NANs), home area networks (HANs), and smart meters for HANs, and in an embodiment, but not by way of limitation, a switch for coupling a smart meter in a HAN to an electric utility's advanced metering infrastructure (AMI)/advanced meter reading (AMR) network.

BACKGROUND

Smart grid utility networks connect to residence home area networks (HANs). In most of these networks, a smart meter (usually an electric meter) takes on the role of a trust center. As the trust center, the smart meter is responsible for acting as the network coordinator, storing network information and security keys, authenticating newly added devices to the HAN, and associating devices to the HAN. Over the years, the tasks and other roles of the trust center have expanded, and to this day these tasks and roles continue to expand. This expansion has been caused by evolving smart energy profile specifications and the amount of necessary HAN data that must be stored and processed (e.g., device profile information, software upgrades, sensed data, etc.) at the trust center. Consequently, having the meter act as the trust center in a smart grid HAN network is becoming an expensive proposition for utility companies from hardware, software, manageability, and maintenance perspectives.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

In response to the above-described expansion of the functions of a smart meter that operates as a trust center, a lot of thinking in the industry today is that the trust center functionality should be moved to a new device in the home like a gateway device, which could be an altogether different device that a homeowner or utility would have to purchase to ensure secure trust center management of their utility smart grid HAN as well as to perform other software upgrades or processing and storage of data.

In contrast to this current trend of thinking, embodiments of this disclosure keep the meter as the trust center. Keeping the meter as the trust center keeps meter costs low, and keeps processing and data storage requirements to a minimum. To maintain the meter as the trust center, in light of the expanding roles and functions of the trust center, a utility smart grid HAN meter trust center must be kept "light" or "thin" by migrating several of the traditional trust center functions out of the meter trust center. As a result of this migration, the meter trust center is responsible mostly for communication between a utility's advanced metering infrastructure (AMI)/advanced meter reading (AMR) network and the HAN, for facilitation of communication between the utility and HAN devices. Consequently, the general field of this disclosure relates to a HAN's smart energy meter trust center. More precisely, the disclosure relates to migrating the distributed trust center functionality to a centralized location in order to "thin out" the meter trust center to reduce the total cost of ownership, complexity, and storage capacity requirements on a per device basis.

Specifically, an embodiment is a method and apparatus to reduce the burden placed on meter trust centers by centralizing many of the key trust center features into a trust-center switch rather than distributing the functions over individual meter trust centers (i.e., meters) for different residences. That is, portions of trust center functionality are migrated from distributed meter trust centers to a centralized device. This migration is helpful to utility managed smart energy HANs that exist at a residence. Likewise, this migration can be useful in multi-dwelling unit (MDU) residences (such as an apartment building) that maintain multiple trust centers (i.e., electric meters) to support co-existing utility maintained HANs and residence owner managed HANs.

The disclosed embodiments herein provide several features. For example, a hierarchical system for trust centers reduces the security impact, complexity, and upgradability impact on smart meter trust centers and other thin trust center devices residing at a residence. Also, a centralized trust center can manage in parallel trust center operations for a plurality of independent and geographically dislocated thin trust center client devices. Further, the centralizing of trust center operations and the placing of complexity at this centralized device reduces the total cost of ownership for distributed meter trust centers. Also, a switching device can include a plurality of different communication interfaces (e.g., Wi-Fi, ZigBee, Ethernet, Cellular, and PLC), such that one interface is a Wi-Fi interface, a second interface is an Ethernet, and a third interface might be cellular, thereby enabling communication with different entities among the HANs and the AMI/AMR.

An embodiment includes hardware and software that is used to centralize smart grid utility trust center functionality at a first device, which can be referred to as a trust center switch, and by moving this functionality from at least one other second device, that is, the trust center meter. This transfer of functionality from the smart meter to the switch thins out the required trust center functionality (e.g., security credential storage, authentication, and association functions), data storage, and the total cost of ownership of this second or subsequent device. This embodiment creates a hierarchical trust center architecture wherein the bulk of the trust center manageability and activity is performed at the trust center switch. This thin trust center approach could be extended to other intended trust center devices like gateways, routers, and home energy managers, provided they can connect to the these trust center switches.

Typical meter trust centers (and also alternate HAN trust centers) maintain configuration data for devices in their HAN, perform client authentication, store security keys and other credential information, and provide communication access to the AMI/AMR utility network. In an embodiment however, the amount of intelligence and functionality of the meter trust center or similar resident HAN trust center is reduced. The meter trust center is responsible for communication between the utility AMI/AMR network and the HAN, and assists client device association and authentication. The meter trust center however does not perform authentication, security key storage, or other high intensive trust center operations. A goal is to reduce the code footprint for the meter trust center and its required processing requirements, as well as the data storage requirements for the device.

Simplified meter trust centers can be used in conjunction with a trust center switch. The trust center switch serves as a master controller that provides a single point of administration for all meter trust centers that it controls. The trust center switch configures, controls, manages, and secures the environment for one or more meter trust centers connected to it. Use of a switch and the thin clients produces a two tiered hierarchical trust center network where the trust center switch resembles the node at the top of the hierarchy and the thin trust center clients (i.e., meter trust centers) represent the leaves or end-point devices on the next tier of the hierarchical trust center network.

Figure 1:
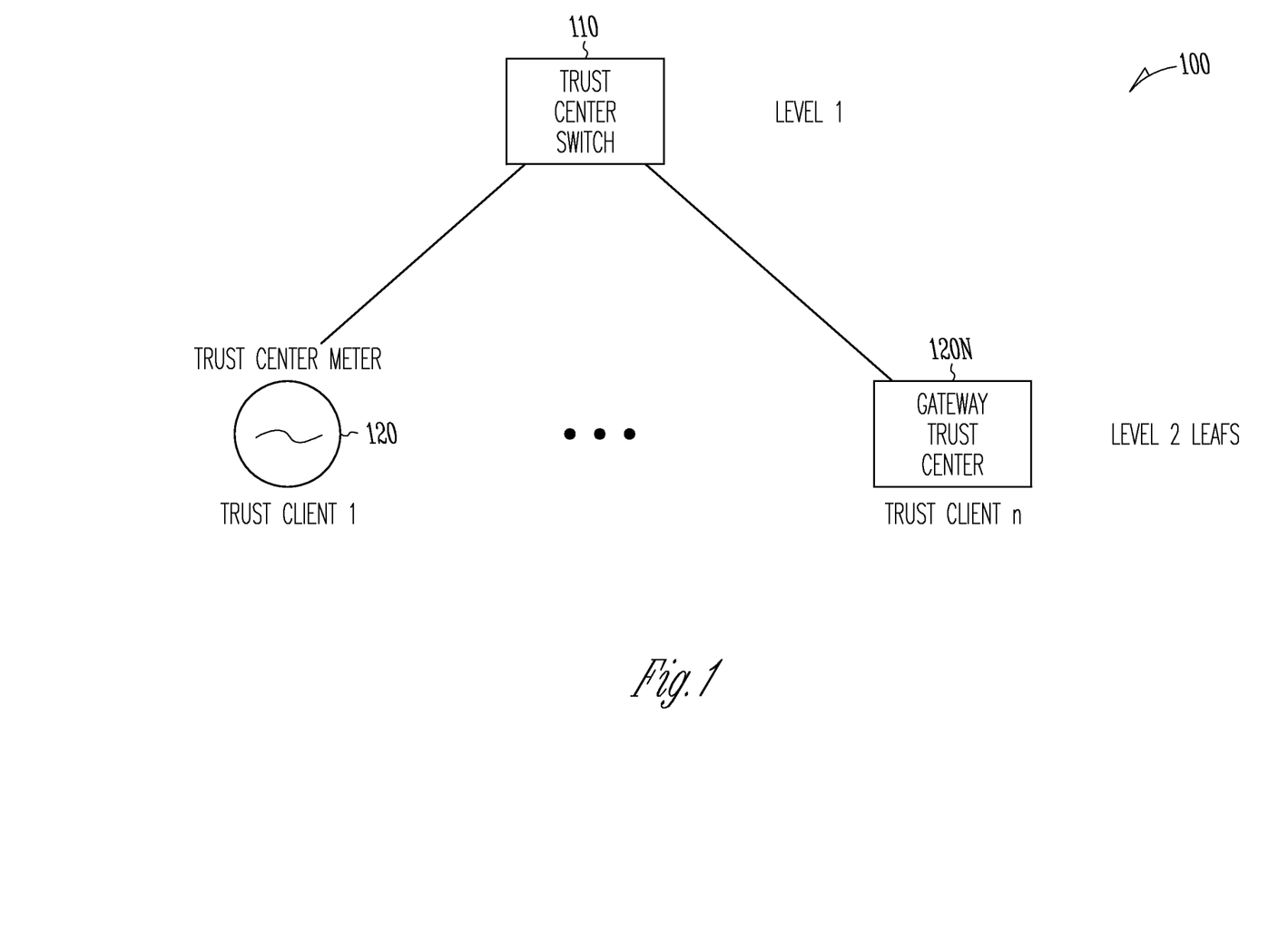
FIG. 1 is a block diagram of a trust center hierarchical network.
Figure 2:
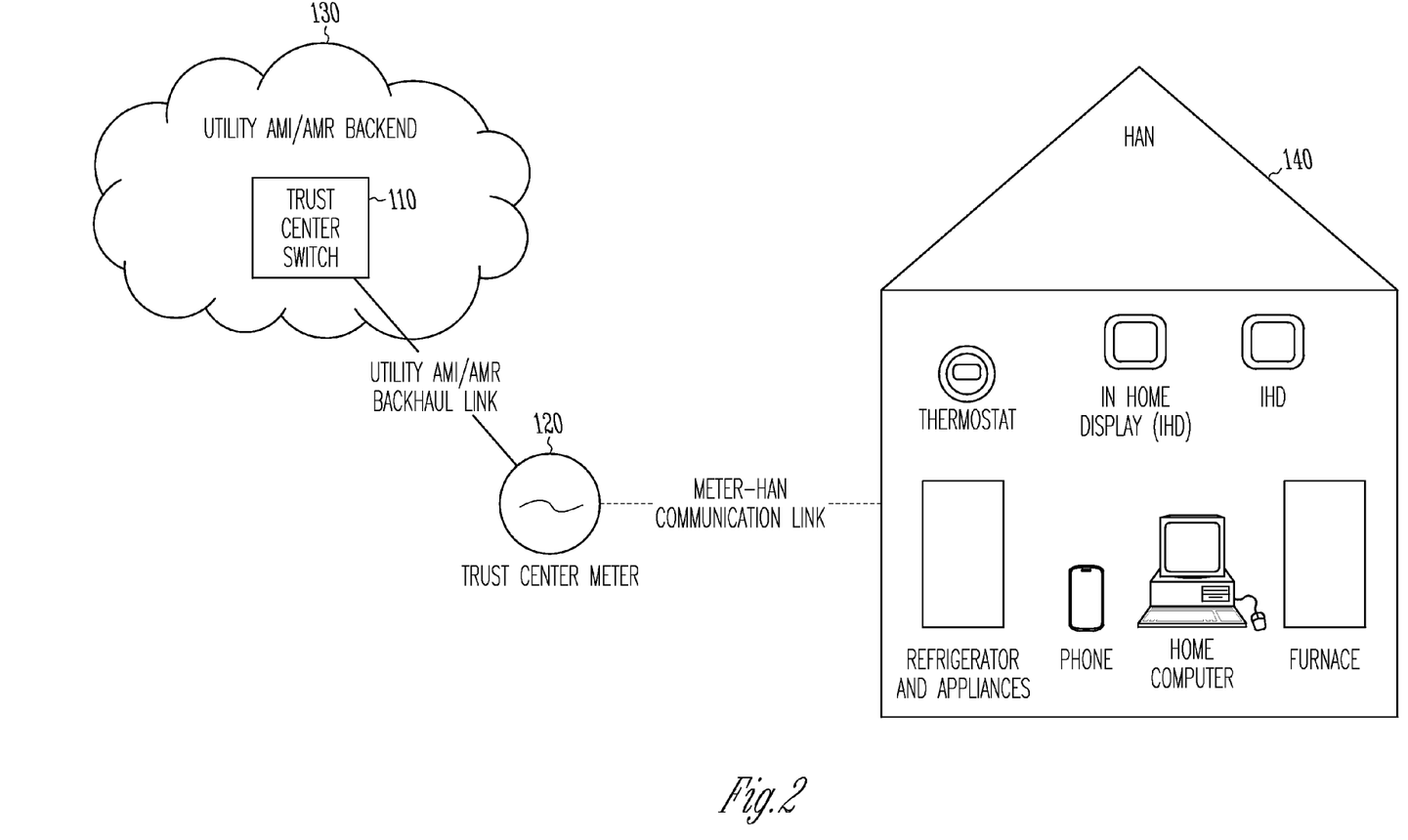
FIG. 2 is a block diagram of a trust center switch and one thin trust center client meter.
Figure 3:
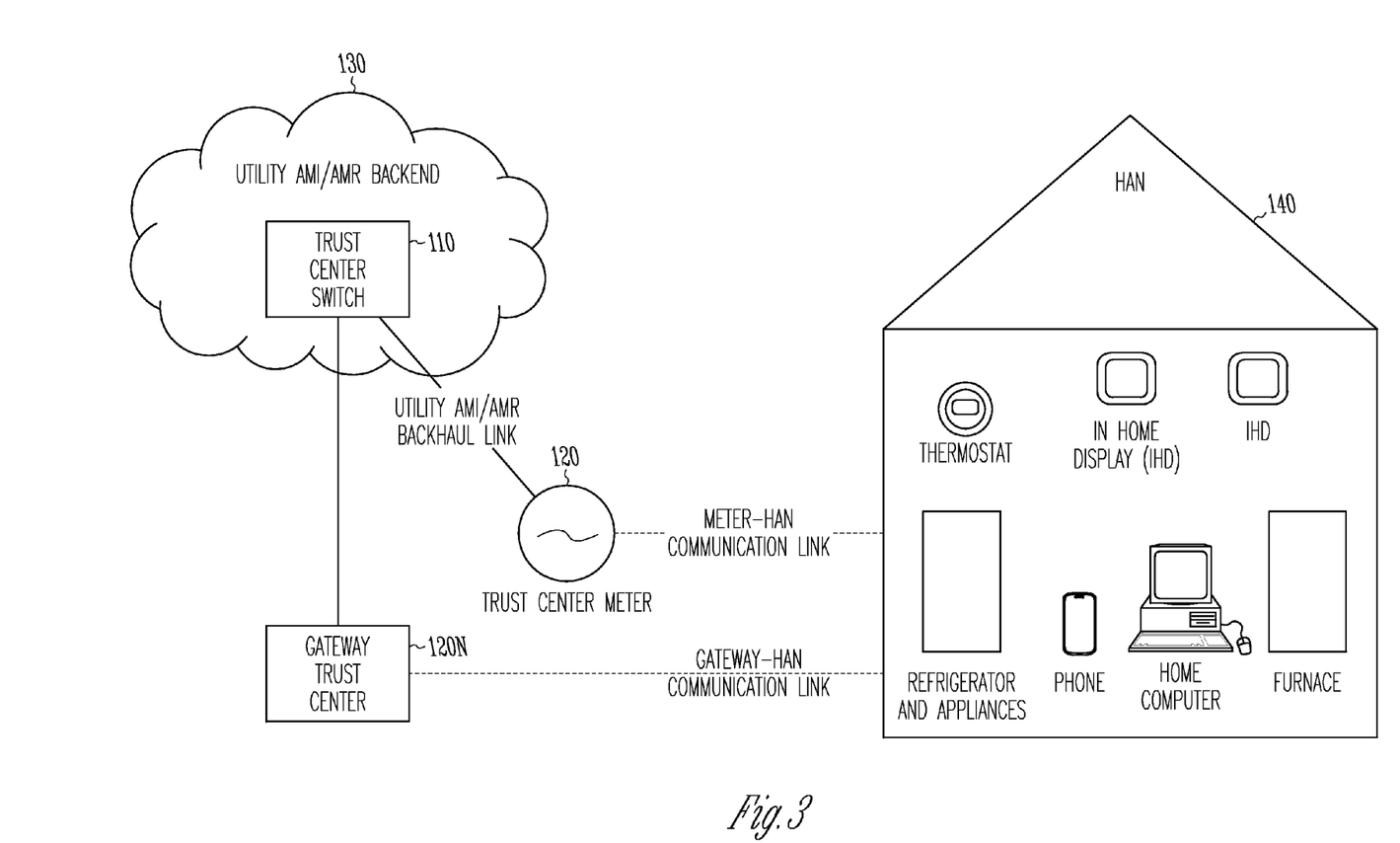
FIG. 3 is a block diagram of a trust center switch and two thin trust center clients in the form of a meter and a gateway.
Figure 4:
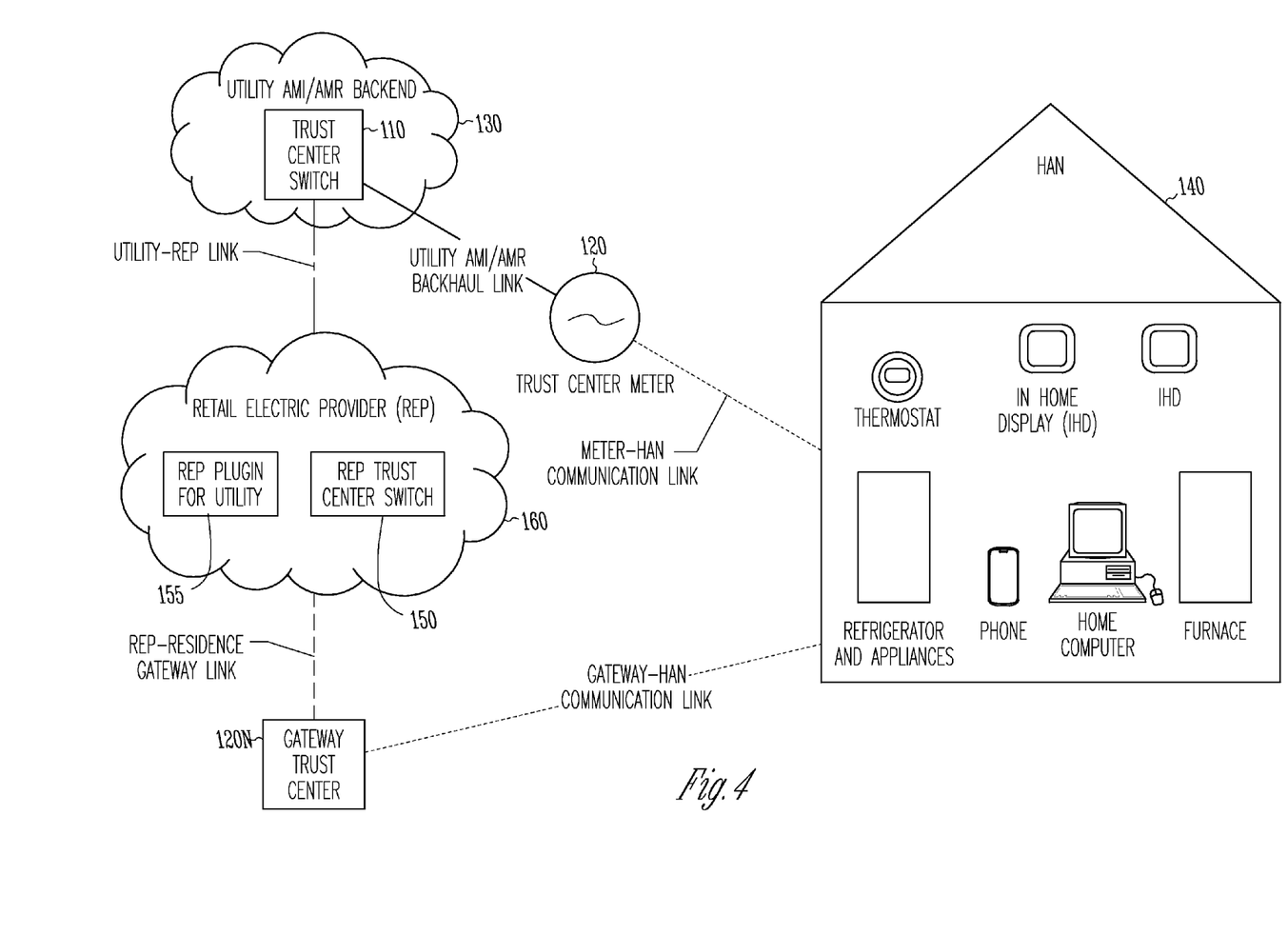
FIG. 4 is another block diagram of a trust center switch, two thin trust center clients, a meter, and a gateway.

FIGS. 1, 2, 3, and 4 illustrate block diagrams of trust center switches, trust center meters, and other devices within and between a HAN and an AMI/AMR. Specifically, FIG. 1 is a block diagram of a trust center hierarchical network 100. The network 100 includes a trust center switch 110, one or more trust center meters 120, and in an embodiment, a gateway trust center 120N. FIG. 2 is a block diagram of a trust center switch 110 and one thin trust center client meter 120. FIG. 2 further illustrates a utility's AMI/AMR backend 130. The HAN 140 can include several household devices such as a thermostat, refrigerator, phone, home computer, and furnace. FIG. 3 is a block diagram of a trust center switch 110, and two thin trust center clients 120 and 120N in the form of a meter and a gateway. FIG. 4 is another block diagram of a trust center switch and two thin trust center clients 120, 120N in the form of a meter and a gateway. FIG. 4 further illustrates a retail electric provider (REP) 160 and a trust center switch 150 and an REP Plug in for the utility 155 within the realm of the REP 160.

The secure trust center's authentication and association messages are exchanged only between clients and the trust center switch. Clients are not restricted from communicating general data or other local HAN information with other clients in their vicinity, but explicit trust center communications occur on a client to switch basis solely. An aim here is to ensure, as much as possible, secure communication between the switch and the client. To this end, the communication link between client and trust center switch may have more stringent security requirements than the communication link between communicating client devices and HAN devices attaching to these thin trust center clients. Another security measure for the communication link between the trust center switch and the thin trust center clients includes requiring that the communication use levels of encryption, and/or require that the communication take place over a unique, restricted wireless communication medium like a cellular backhaul or over a dedicated wired communication link like a T1 line.

The protocol for set up of the network, together with the trust center switch and the meter trust center, includes the following steps. First, one or more meter trust centers have to discover the trust center switch and the trust center switch has to discover the meter trust centers. This process is accomplished at the point of installation of the utility meter. Once installed at a residence and connected to the utility advanced metering infrastructure (AMI)/advanced meter reading (AMR) network, the meter listens for periodic "hello" beaconing messages sent by the nearest trust center switch. Once a beacon message is discovered, the thin meter trust center initiates authentication and association with the trust center switch. The AMI/AMR network connection between the meter and the utility back-end might be accomplished through a broadband wireless connection (e.g., a cellular network, LTE, WiMAX, iDen, or Wi-FI) or a wired connection (e.g., Ethernet, Broadband Power Line Communication (BPLC), PLC, or twisted pair telephone communication like DSL).

Second, the trust center switch downloads (pushes) the latest thin-layer firmware to the meter trust center. Third, the trust center switch downloads (pushes) the latest utility configurations for that meter trust center (e.g., security credentials, unique identifier, utility program enrollment information, etc.) to the meter.

Once completely networked, the trust center switch and meter trust center support the several functions. First, the meter trust center associates devices local to its HAN by transporting client association and security information to the trust center switch. The trust center switch will perform the client authentication using any additional information from the utility processing center like a specific utility based enrollment program in which the particular client device may participate such as in a demand response and load control (DRLC) program (e.g., a DRLC enabled thermostat). Second, the trust center switch maintains configuration data or stores it in utility side databases where it can store and fetch the data without having to poll the client device back in the residence HAN. Third, the trust center switch and meter trust center are responsible for the transport of client data and utility control information in both directions, that is, from the utility to the residence and from the residence to the utility.

The trust center switch can receive data either from the trust center meter or from the utility backend. If the data is coming from the utility backend, the switch trust center may convert or encapsulate data from wired (wireless) format to a wireless (wired) format. The trust center also performs the necessary routing functions using a routing table to route data to the appropriate meter trust center to which it is attached. The trust center switch processes the data packets in a way similar to the traditional full-blown thick meter trust center.

FIG. 4 illustrates that there may be multiple trust center switches managed by different entities that interface with the residence HAN through pathways through two different thin trust center clients—the trust center meter 120 and a trust center gateway 120N. In this example, a retail electric provider (REP) 160 interfaces with the utility 130, presumably for pricing and other smart energy information. The REP processes this information and can communicate information to HAN 140 devices via its own REP trust center switch 150 and thin trust center gateway client 120N. In this scenario, multiple trust center switches exist—at least one trust center switch in a utility acting as a primary trust center switch and at least one other trust center switch located with the REP that acts as a secondary trust center switch. Such an example embodies scenarios that may very well happen in deregulated energy markets.

The trust center switch typically includes at least one processing unit (FIG. 5, No. 21), memory (FIG. 5, No. 22) (portions of the memory may be allocated for each meter trust center associated with the switch), a management unit block (FIG. 5, No. 60) to manage communications and processes for each associated thin trust center, and a plurality of interfaces (FIG. 5, No. 65) (e.g., Ethernet, ZigBee, WiMax, Wi-Fi, BPLC, cellular, etc) for the plurality of meter trust centers that it supports.

A particular example embodiment is applicable to a multi-tier apartment building. For example, in a multi-tier apartment building, there is normally a bank of utility electric meters in the basement of the building. Each meter represents a full-blown "thick" meter trust center for each apartment unit. In such a scenario, a utility is responsible for upgrading or replacing each trust center should a new version of a smart energy metering profile become available. This process would be a costly and disruptive endeavor for both the utility and the residents.

However, using an embodiment of this disclosure, a utility could use a trust center switch to support the entire bank of utility electric meters, essentially thinning out each trust center meter. The switch would centralize the trust center functionality for each meter. Because less memory and processing would be required for trust center functions, the meters would have meter resources available for protocol upgrades. This means having more than enough memory and processing resources to handle smart protocol upgrades without requiring a full meter swap out, disruption of service, purchase of new meters, or utility truck roll outs for a technician to replace the existing meter.

Further benefits of the embodiments of this disclosure are as follows. When a utility deploys thousands of meters, manual configuration of each meter becomes tedious and expensive. This is particularly the case when considering that meter configurations like hardware upgrades require technicians to address any work needed. This thin trust center/trust center switch enables utility network administrators to set up a single configuration at the trust center switch, and push it to all of the thin meter trust centers at the same time. Firmware upgrades of the meter trust center are equally easy. Once a switch gets a firmware upgrade, it pushes the upgrade to the thin meter trust centers and verifies that the upgrade was successful.

Still further benefits include the following. From a management standpoint, managing one trust center switch that manages a large group of meter trust centers is equivalent to the management of one full-blown thick meter trust center. Trust center switches are scalable and support the addition of more and more meter trust centers per trust center switch. The trust center switch eliminates security threats by providing centralized authentication and encryption, which allows better management of security functions and policies. A full blown meter trust center might be vulnerable to attack as they contain, for example, sensitive data, access control lists, certificates, and security keys (a problem if the meter trust center is stolen). Additionally, reducing the complexity at the metering trust center means that even current meter trust centers running smart energy protocols can migrate to newer smart energy protocols (SEPs) using reduced function sets without having to require hardware upgrades/swap outs or brand new meters which would necessitate utility truck roll-outs which also add to the total cost of ownership of meter devices.

In an embodiment, a trust center switch functionality could be provided as a service in a cloud computing environment. At the same time, an embodiment provides secure communications between the trust center switch and one or more meter trust centers.

Figure 5:
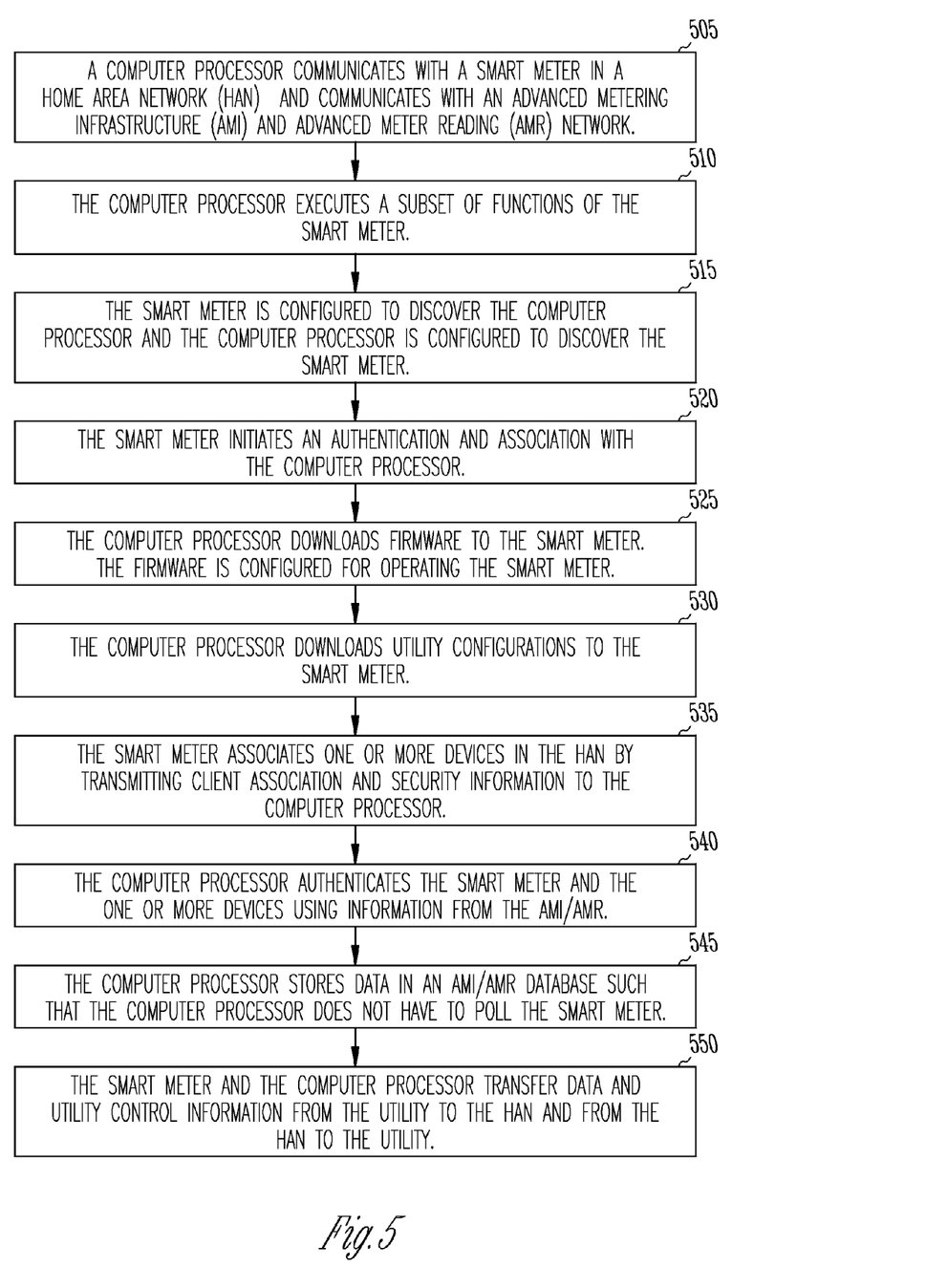
FIG. 5 is a flowchart-like diagram illustrating the features of a system and method for a smart meter trust center switch.
Figure 6:
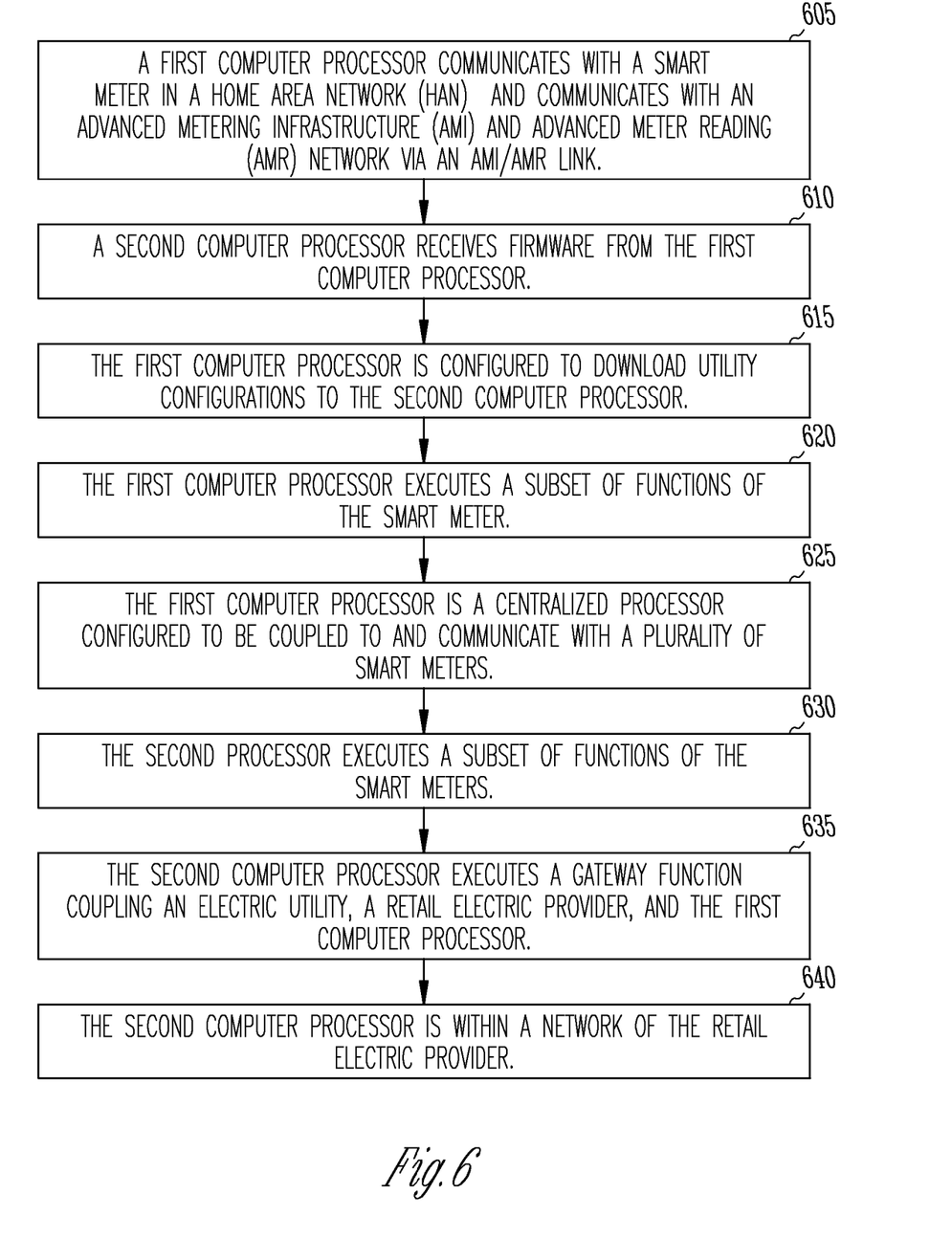
FIG. 6 is a flowchart-like diagram illustrating the features of a another system and method for a smart meter trust center switch.

FIGS. 5 and 6 are flowchart-like diagrams illustrating the features of a system and method for a smart meter trust center switch. FIGS. 5 and 6 include a number of blocks 505-550 and 605-640. Though arranged serially in the example of FIGS. 5 and 6, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIG. 5, at 505, a computer processor communicates with a smart meter in a home area network (HAN) and communicates with an advanced metering infrastructure (AMI) and advanced meter reading (AMR) network. At 510, the computer processor executes a subset of functions of the smart meter.

At 515, the smart meter is configured to discover the computer processor and the computer processor is configured to discover the smart meter. At 520, the smart meter initiates an authentication and association with the computer processor. At 525, the computer processor downloads firmware to the smart meter. The firmware is configured for operating the smart meter. At 530 the computer processor downloads utility configurations to the smart meter. The utility configurations comprise one or more of a security credential, a unique identifier, and a utility program enrollment information.

At 535, the smart meter associates one or more devices in the HAN by transmitting client association and security information to the computer processor. At 540, the computer processor authenticates the smart meter and the one or more devices using information from the AMI/AMR. At 545, the computer processor stores data in an AMI/AMR database such that the computer processor does not have to poll the smart meter. At 550, the smart meter and the computer processor transfer data and utility control information from the utility to the HAN and from the HAN to the utility.

Referring to FIG. 6, at 605, a first computer processor communicates with a smart meter in a home area network (HAN) and communicates with an advanced metering infrastructure (AMI) and advanced meter reading (AMR) network via an AMI/AMR link. At 610, a second computer processor receives firmware from the first computer processor. The firmware is configured for operating the second computer processor. At 615, the first computer processor is configured to download utility configurations to the second computer processor. The utility configurations comprises one or more of a security credential, a unique identifier, and utility program enrollment information.

At 620, the first computer processor executes a subset of functions of the smart meter. At 625, the first computer processor is a centralized processor configured to be coupled to and communicate with a plurality of smart meters. The subset of functions of the smart meter comprises non-communication functions, and the communication functions relate to communications between the smart meter and the AMI/AMR network. At 630, the second processor executes a subset of functions of the smart meter. At 635, the second computer processor executes a gateway function coupling an electric utility, a retail electric provider, and the first computer processor. At 640, the second computer processor is within a network of the retail electric provider.

Figure 7:
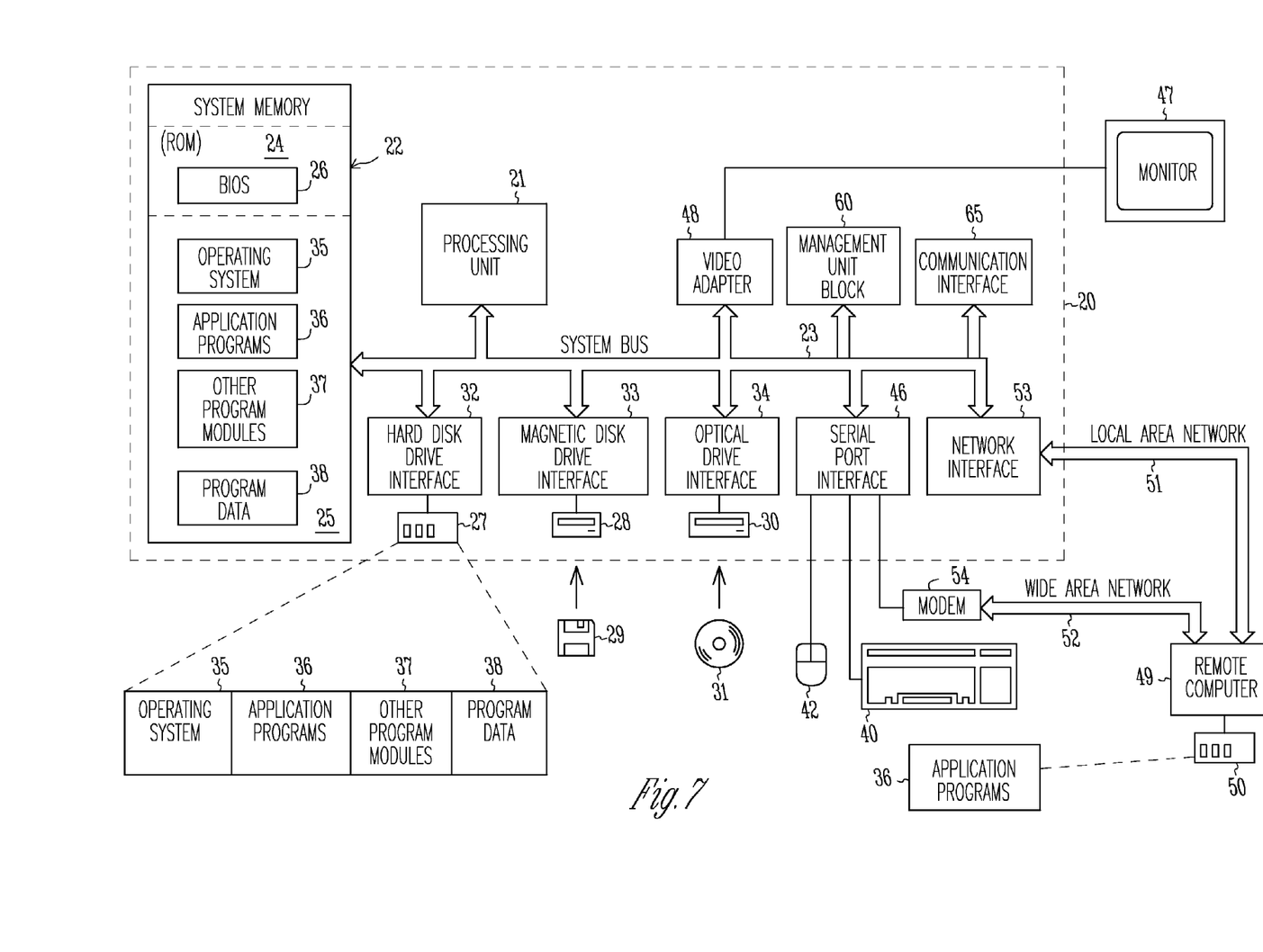
FIG. 7 is a block diagram of a hardware environment upon which or in connection with which one or more embodiments of this disclosure may operate.

FIG. 7 is an overview diagram of hardware and an operating environment in conjunction with which embodiments of the invention may be practiced. The description of FIG. 7 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 7, a hardware and operating environment is provided that is applicable to any of the servers and/or remote clients shown in the other Figures.

As shown in FIG. 7, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user of the system may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 47 can display a graphical user interface for the user of the system. In addition to the monitor 47, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/0 relative to the computer 20, although only a memory storage device 50 has been illustrated. The logical connections depicted in FIG. 7 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. §1.72(b) and will allow the reader to quickly ascertain the nature and essence of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. An apparatus comprising:
a computer processor configured to: execute a subset of functions of a smart meter in a home area network (HAN);
wherein the computer processor is configured to be coupled to and communicate with the smart meter, and to communicate with an electric utility advanced metering infrastructure (AMI) and advanced meter reading (AMR) network;
wherein the subset of functions of the smart meter comprises coordinating the HAN, storing HAN information, storing one or more security keys, authenticating devices for the HAN, associating devices in the HAN with the smart meter of the HAN, storing device profile information, handling software upgrades, and storing sensed data;
wherein the computer processor comprises a centralized processor configured to be coupled to and communicate with a plurality of smart meters; and
wherein the computer processor is coupled to and is configured to communicate with a retail electric provider (REP), and wherein the REP comprises a second computer processor that is configured to execute a subset of functions of the smart meter in the HAN.

2. The apparatus of claim 1, wherein the computer processor is a centralized processor configured to be coupled to and communicate with a plurality of smart meters.

3. The apparatus of claim 2, wherein the centralized computer processor is configured to communicate in parallel with the plurality of smart meters.

4. The apparatus of claim 2, wherein the centralized computer processor comprises a plurality of communication interfaces with different communication protocols for communicating with the plurality of smart meters.

5. The apparatus of claim 1, wherein the subset of functions of the smart meter comprises non-communication functions, wherein communication functions relate to communications between the smart meter and the AMI/AMR network.

6. The apparatus of claim 1, wherein the computer processor is coupled to and is configured to communicate with a gateway trust center.

7. A process comprising:
providing a computer processor to communicate with a smart meter in a home area network (HAN) and to communicate with an advanced metering infrastructure (AMI) and advanced meter reading (AMR) network; and executing in the computer processor a subset of functions of the smart meter;
wherein the subset of functions of the smart meter comprises coordinating the HAN, storing HAN information, storing one or more security keys, authenticating devices for the HAN, associating devices in the HAN with the smart meter of the HAN, storing device profile information, handling software upgrades, and storing sensed data; and
wherein the computer processor is coupled to and is configured to communicate with a retail electric provider (REP), and wherein the REP comprises a second computer processor that is configured to execute a subset of functions of the smart meter in the HAN.

8. The process of claim 7, wherein providing the computer processor to communicate with a smart meter comprises configuring the smart meter to discover the computer processor and configuring the computer processor to discover the smart meter.

9. The process of claim 8, wherein the smart meter initiates an authentication and association with the computer processor.

10. The process of claim 7, wherein the computer processor downloads firmware to the smart meter, the firmware configured for operating the smart meter, and wherein the computer processor downloads utility configurations to the smart meter, the utility configuration comprising one or more of a security credential, a unique identifier, and a utility program enrollment information.

11. The process of claim 7, wherein the smart meter associates one or more devices in the HAN by transmitting client association and security information to the computer processor; and wherein the computer processor authenticates the smart meter and the one or more devices using information from the AMI/AMR.

12. The process of claim 7, wherein the computer processor stores data in an AMI/AMR database such that the computer processor does not have to poll the smart meter.

13. The process of claim 7, wherein the smart meter and the computer processor transfer data and utility control information from the utility to the HAN and from the HAN to the utility.

14. A process comprising:
providing a first computer processor to communicate with a smart meter in a home area network (HAN) and to communicate with an advanced metering infrastructure (AMI) and advanced meter reading (AMR) network via an AMI/AMR link;
executing in the first computer processor a subset of functions of the smart meter; and providing a second computer processor, wherein the second computer processor receives firmware from the first computer processor, the firmware configured for operating the second computer processor;
wherein the first computer processor is configured to download utility configurations to the second computer processor, the utility configurations comprising one or more of a security credential, a unique identifier, and utility program enrollment information;

wherein the subset of functions of the smart meter comprises coordinating the HAN, storing HAN information, storing one or more security keys, authenticating devices for the HAN, associating devices in the HAN with the smart meter of the HAN, storing device profile information, handling software upgrades, and storing sensed data; and wherein the first computer processor is coupled to and is configured to communicate with a retail electric provider (REP), and wherein the REP comprises a second computer processor that is configured to execute a subset of functions of the smart meter in the HAN.

15. The process of claim 14, wherein the first computer processor is a centralized processor configured to be coupled to and communicate with a plurality of smart meters; wherein the subset of functions of the smart meter comprises non-communication functions, and wherein communication functions relate to communications between the smart meter and the AMI/AMR network.

16. The process of claim 14, comprising executing in the second processor a subset of functions of the smart meter, and executing a gateway function coupling an electric utility, a retail electric provider, and the first computer processor.

17. The process of claim 16, wherein the second computer processor is within a network of the retail electric provider.

* * * * *